(12) United States Patent
Huang et al.

(10) Patent No.: US 10,967,620 B2
(45) Date of Patent: Apr. 6, 2021

(54) METHOD OF PREPARING ELASTOMER MEMBRANE WITH HIGH WATER PRESSURE RESISTANCE

(71) Applicant: Taiwan Textile Federation, R.O.C., Taipei (TW)

(72) Inventors: Shu-Hui Huang, Taipei (TW); Sheng-Jen Lin, Taipei (TW); Yao-Hung Kuo, Taipei (TW); Jian-Fan Chen, Taipei (TW); Hung-Kung Chien, Taipei (TW); Yu-chuan Lin, Taipei (TW); Yun-chin Kuo, Taipei (TW)

(73) Assignee: TAIWAN TEXTILE FEDERATION, R.O.C., Taipei (TW)

( * ) Notice: Subject to any disclaimer, the term of this patent is extended or adjusted under 35 U.S.C. 154(b) by 196 days.

(21) Appl. No.: 16/445,211

(22) Filed: Jun. 19, 2019

(65) Prior Publication Data
US 2020/0338874 A1 Oct. 29, 2020

(30) Foreign Application Priority Data
Apr. 25, 2019 (TW) .................. 108114464

(51) Int. Cl.
*B32B 27/40* (2006.01)
*B32B 27/18* (2006.01)
(Continued)

(52) U.S. Cl.
CPC ................ *B32B 27/40* (2013.01); *B29D 7/01* (2013.01); *B32B 27/18* (2013.01);
(Continued)

(58) Field of Classification Search
CPC ......... B29C 43/24; B29C 48/08; B29C 48/10; B29C 48/18; B29C 48/21; B29D 7/01; B32B 27/08; B32B 27/18; B32B 27/26; B32B 27/40; B32B 37/02; B32B 37/15; B32B 37/153; B32B 37/156; B32B 37/24; B32B 38/0036; B32B 38/16; B32B 38/164; B32B 2038/166; B32B 2250/03; B32B 2250/24; B32B 2250/40; B32B 2264/0221; B32B 2264/0292; B32B 2305/72;
(Continued)

(56) References Cited

U.S. PATENT DOCUMENTS

2009/0093179 A1* 4/2009 Kong ...................... B32B 5/022
442/290
2016/0122595 A1* 5/2016 Feng .................... B29C 48/0021
428/337

* cited by examiner

*Primary Examiner* — Michael A Tolin
(74) *Attorney, Agent, or Firm* — Chun-Ming Shih; HDLS IPR Services (57) ABSTRACT

A method of preparing an elastomer membrane with high water pressure resistance includes the following steps: preparing a dry material by subjecting first thermoplastic polyurethane (TPU) powder/particles to a drying treatment; preparing a first mixture by mixing the dry material thoroughly with one or a mixture of at least two of diethylenetriamine, diethylaminopropylamine, and diaminodiphenylmethane; preparing a second mixture by mixing an initiator thoroughly with the first mixture; preparing a first membrane layer from the second mixture; and preparing a second membrane layer and a third membrane layer through the above steps such that the second membrane layer and the third membrane layer are sequentially formed on the first membrane layer.

10 Claims, 5 Drawing Sheets

(51) Int. Cl.
  *C08G 18/32*  (2006.01)
  *B29D 7/01*  (2006.01)
  *D06N 3/14*  (2006.01)
  *B32B 38/16*  (2006.01)
  *B29C 48/08*  (2019.01)

(52) U.S. Cl.
  CPC .......... *C08G 18/3228* (2013.01); *B29C 48/08* (2019.02); *B32B 2038/166* (2013.01); *B32B 2250/03* (2013.01); *B32B 2250/40* (2013.01); *B32B 2264/0292* (2013.01); *B32B 2307/51* (2013.01); *B32B 2307/70* (2013.01); *B32B 2307/7265* (2013.01); *B32B 2375/00* (2013.01); *D06N 3/145* (2013.01)

(58) Field of Classification Search
  CPC ............ B32B 2307/51; B32B 2307/70; B32B 2307/7265; B32B 2375/00; B32B 2437/02; C08G 18/088; C08G 18/0895; C08G 18/3228; C08G 18/3243; C08G 18/325; C08G 18/833; D06N 3/145
  See application file for complete search history.

METHOD OF PREPARING ELASTOMER MEMBRANE WITH HIGH WATER PRESSURE RESISTANCE

BACKGROUND OF THE INVENTION

Technical Field

The present invention relates to a method of preparing an elastomer membrane with high water pressure resistance. More particularly, the invention relates to a method of preparing a thermoplastic polyurethane membrane with high water pressure resistance as well as high adhesion and high elasticity.

Description of Related Art

Thermoplastic polyurethane (TPU) is an elastomer in extensive use in the textile fabric industry, shoe material industry, and apparel industry. Generally, TPU is formed as a pressure-sensitive adhesive (PSA) membrane to enable adhesive attachment of, for example, a trademark label or decoration to a textile, clothing fabric, or shoe material by a high-frequency bonding technique. To make such elastomer membranes more resistant to water or moisture, it is common practice to form a sandwich structure (i.e., laminated structure) of three TPU membrane layers.

As is well known in the art, the bond between a conventional TPU membrane and a fabric (or fibers thereof) is temporary adhesion, which typically consists in the adhesion between the polymer chains of thermoplastic polyurethane (TPU) and a diisocyanate compound, without any other adhesive bonding mechanism involved, and this is why a conventional TPU membrane cannot completely cover the fibers it is attached to. If, therefore, an article is adhered to a textile solely by a conventional laminated TPU membrane, it can be expected that the article may peel off easily, or the TPU membrane layers may delaminate (or undergo phase separation), due to the membrane' inadequate adhesion and low elasticity. Moreover, the fact that a conventional TPU membrane cannot completely cover the fibers it is adhered to tends to compromise the waterproofness of a conventional laminated TPU membrane that is adhesively attached to a fabric, making the laminated TPU membrane permeable to water of relatively high pressure.

The issue to be addressed by the present invention is to design a method for preparing an elastomer membrane with high water pressure resistance, or more particularly for making a laminated elastomer membrane by mixing a modifier with TPU powder/particles so that the resulting membrane features structural integrity, has a uniform thickness, and is enhanced in water pressure resistance, adhesion, and elasticity when compared with the prior art.

BRIEF SUMMARY OF THE INVENTION

To solve the aforesaid problem of the prior art, the present invention provides a method of preparing an elastomer membrane with high water pressure resistance. The method includes the steps of: (a) preparing a dry material by subjecting first TPU powder/particles to a drying treatment at 70° C.~85° C.; (b) preparing a modifier, wherein the modifier is one or a mixture of at least two of diethylenetriamine, diethylaminopropylamine, and diaminodiphenylmethane; (c) preparing a first mixture by mixing the dry material thoroughly with the modifier in a weight ratio of 50%~95%:5%~50%; (d) preparing a second mixture by mixing an initiator thoroughly with the first mixture in a weight ratio of 0.01~5:100; (e) preparing a first membrane layer by passing the second mixture through a mixing device and a lamination device; (0 preparing a second membrane layer by repeating step (a) to step (e) with second TPU powder/particles, wherein the second TPU powder/particles have a weight-average molecular weight higher than or equal to that of the first TPU powder/particles, and the second membrane layer is formed on the first membrane layer; and (g) preparing a third membrane layer by repeating step (a) to step (e) with third TPU powder/particles, wherein the third TPU powder/particles have the same weight-average molecular weight as the first TPU powder/particles, and the third membrane layer is formed on the second membrane layer.

In one embodiment, the modifier is a mixture of diethylenetriamine, diethylaminopropylamine, and diaminodiphenylmethane in a weight ratio of 30%~50%:30%~50%:10%~30%.

In one embodiment, the modifier is a mixture of diethylenetriamine, diethylaminopropylamine, and diaminodiphenylmethane in a weight ratio of 40%:40%:20%.

In one embodiment, the first TPU powder/particles and the third TPU powder/particles have weight-average molecular weights between 10000 and 30000 inclusive, Shore hardnesses between 50 A and 100 A inclusive, and melting points between 40° C. and 180° C. inclusive, and the second TPU powder/particles have a weight-average molecular weight between 30000 and 100000 inclusive, a Shore hardness between 50 A and 100 A inclusive, and a melting point between 40° C. and 180° C. inclusive.

In one embodiment, the initiator is a photoinitiator or a thermal initiator.

In one embodiment, the initiator is thoroughly mixed with the first mixture in a weight ratio of 0.5:100.

In one embodiment, the initiator is potassium persulfate, azobisisobutyronitrile, or benzildimethyl ketal.

In one embodiment, each of the first membrane layer, the second membrane layer, and the third membrane layer includes a plurality of layers of TPU polymer chains and a plurality of modifying molecule chains, the modifying molecule chains are grafted to the TPU polymer chains, and the second membrane layer has a higher TPU polymer chain density than the first membrane layer and the third membrane layer.

In one embodiment, each layer of TPU polymer chains includes a plurality of hard segments and a plurality of soft segments, and the modifying molecule chains are grafted to the hard segments respectively or are grafted between the hard segments and the soft segments respectively.

The techniques and means adopted by the present invention to achieve the aforesaid objective and the effects of those techniques and means can be better understood by referring to the following detailed description in conjunction with the accompanying drawings. The detailed description and the drawings are also expected to enable better comprehension of the objective, characteristics, and features of the invention. The drawings, however, serve explicatory purposes only and are not intended to be restrictive of the scope of the invention.

DETAILED DESCRIPTION OF THE INVENTION

A detailed description of the technical content of the present invention is given below with reference to the accompanying drawings.

The present invention provides a method of preparing an elastomer membrane with high water pressure resistance. More specifically, the method is intended for the preparation of a three-layer laminated TPU membrane in which each TPU membrane layer is chemically modified in order for the resulting elastomer membrane to have higher waterproofness, higher adhesion, and higher elasticity than conventionally achievable. The method begins by preparing the first membrane layer through steps (a) to (e). In step (a), a dry material is prepared by subjecting first TPU powder/particles to a drying treatment at 70° C.~85° C., the objective being to remove excess moisture from the first TPU powder/particles and keep the powder/particles dry. In step (b), a modifier is prepared. The modifier may be one or a mixture of at least two of diethylenetriamine (DETA), diethylaminopropylamine (DEAP), and diaminodiphenylmethane (DAPM). In step (c), a first mixture is prepared by mixing the dry material thoroughly with the modifier in a weight ratio of 50%~95%:5%~50%. In step (d), a second mixture is prepared by mixing an initiator thoroughly with the first mixture in a weight ratio of 0.01~5:100. In step (e), a modified TPU membrane is prepared as the first membrane layer by passing the second mixture through a mixing device and a lamination device. The modifier and each of first and the second mixtures may be in the form of a solution, powder/particles, or paste.

Once the first membrane layer is completed, a second membrane layer and a third membrane layer are sequentially formed on the first membrane layer. The second membrane layer and the third membrane layer are also prepared by the foregoing step (a) to step (e) except that the second membrane layer uses second TPU powder/particles in step (a), that the third membrane layer uses third TPU powder/particles in step (a), that the weight-average molecular weight of the second TPU powder/particles is higher than or equal to that of the first TPU powder/particles, and that the weight-average molecular weight of the third TPU powder/particles is equal to that of the first TPU powder/particles. Structurally, therefore, the first membrane layer is identical to the third membrane layer but different from the second membrane layer.

More specifically, the first TPU powder/particles used in step (a) to prepare the first membrane layer preferably has a weight-average molecular weight of 10000~30000, a Shore hardness of 50 A~100 A, and a melting point of 40° C.~180° C. The third membrane layer is designed to be structurally identical to the first membrane layer, so the third TPU powder/particles should have the same weight-average molecular weight, Shore hardness, and melting point as the first TPU powder/particles. The second membrane layer is sandwiched between the first membrane layer and the third membrane layer and is intended to provide high water pressure resistance; therefore, while the Shore hardness and melting point of the second TPU powder/particles may be the same as those of the other two membrane layers, the weight-average molecular weight of the second TPU powder/particles must be higher than or equal to 30000, preferably in the range of 30000~100000.

TPU powder/particles are highly water-absorbent. A product made from damp TPU powder/particles tends to look powdery or frosted, which is undesirable. If dried at too high a temperature, however, TPU powder/particles may melt into a gel. It is therefore preferable to set the temperature of the drying treatment in the present invention at 70° C.~85° C., especially 85° C., at which temperature TPU powder/particles can be dried with the highest efficiency.

In step (b), the modifier is prepared by mixing DETA (0%~100% by weight), DEAP (0%~100% by weight), and DAPM (0%~100% by weight) together. That is to say, the modifier may contain only DETA, only DEAP, only DAPM, or a mixture of the above. When the modifier is so prepared that the DETA:DEAP:DAPM weight ratio is 30%~50%:30%~50%:10%~30%, the end product (i.e., elastomer membrane) has remarkably high water pressure resistance, adhesion, and elasticity. When the DETA:DEAP:DAPM weight ratio is 40%:40%:20%, the end product has the optimal water pressure resistance, adhesion, and elasticity.

In step (c), the weight ratio of the dry material (i.e., the dried first TPU powder/particles) to the modifier is 50%~95%:5%~50%. If the weight ratio of the dried first TPU powder/particles to the modifier is too high (e.g., higher than 95%:5%), the extent of chemical reaction may be so small that the end product functions as an unmodified TPU membrane, i.e., exhibiting substantially the same adhesion and elasticity as an unmodified TPU membrane. If, however, the weight ratio of the dried first TPU powder/particles to the modifier is too low (e.g., lower than 50%:50%), the extent of reaction may be so large that the TPU membrane is decomposed by the modifier, meaning the end product may break as easily as toilet tissues and hence cannot be adhesively attached to a textile fabric. To achieve a satisfactory yield of the end product, therefore, the weight ratio of the dried first TPU powder/particles to the modifier is preferably 70%~75%:25%~30%.

In step (d), the initiator may be a photoinitiator or a thermal initiator and is mixed with the first mixture in a weight ratio of 0.5:100. More specifically, polymerization does not occur automatically but requires a mechanism for driving the polymerization reaction, e.g., a mechanism in which a monomer of the intended polymer is excited by optical or thermal energy to serve as an active center of chemical reaction and the starting point of the polymerization reaction. Nevertheless, an insufficient amount of initiator leads to insufficient polymerization and hence a low product yield, and an excessive amount of initiator results in molecular chains with too many chain ends and therefore also a low product yield. Preferably, the initiator is mixed with the first mixture in a weight ratio of 0.5:100 and is potassium persulfate, azobisisobutyronitrile, or benzildimethyl ketal (2,2-dimethoxy-2-phenylacetophenone).

In step (e), the mixing device may be a twin-screw extrusion mixer, and the lamination device may be a onesided or two-sided laminator. As the membrane forming process may vary with the mixing device and lamination device of choice, the present invention encompasses all the manufacturing devices that can be used to prepare the laminated TPU membrane disclosed herein.

Figure 1:
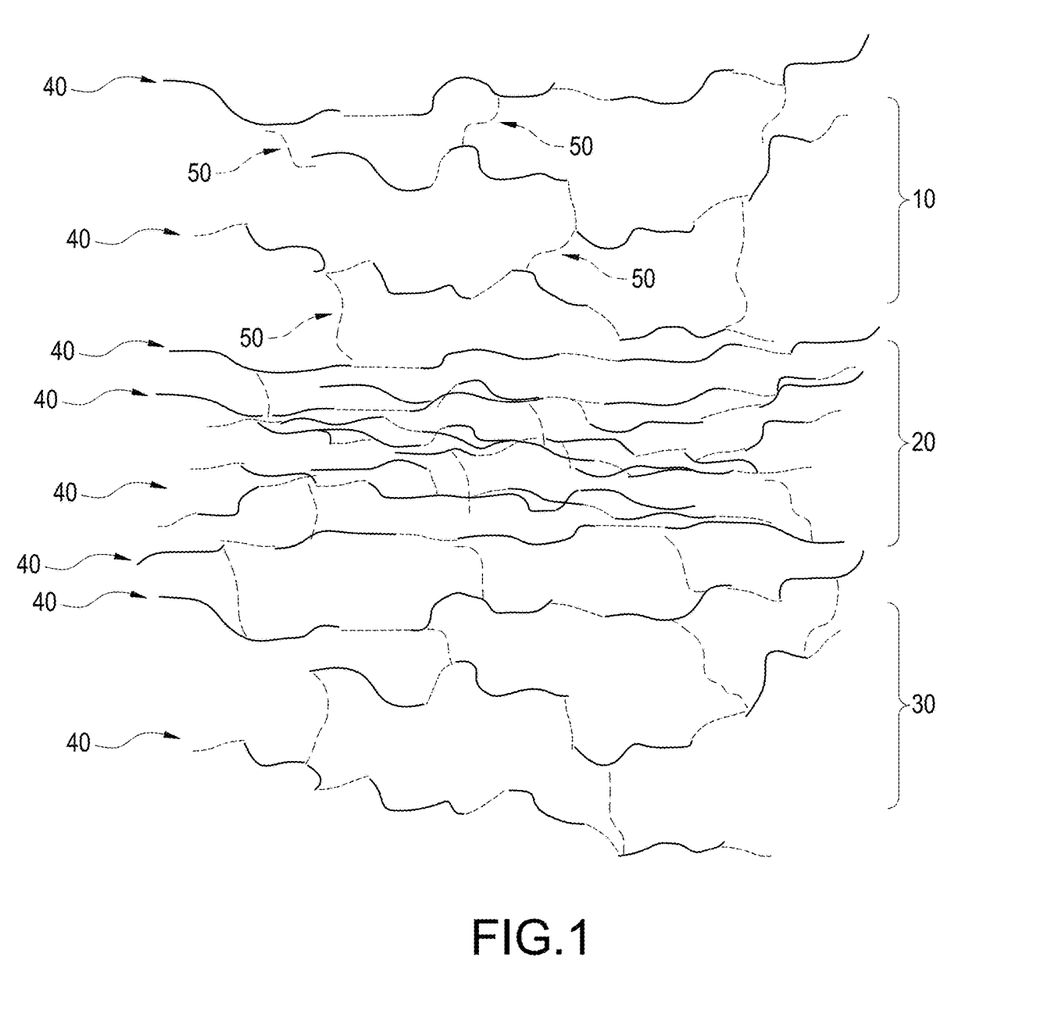
FIG. 1 is a schematic drawing of the structure of an elastomer membrane with high water pressure resistance according to the present invention.

FIG. 1 schematically shows the structure of an elastomer membrane with high water pressure resistance according to the present invention, as observed with a scanning electron microscope (SEM). The elastomer membrane with high water pressure resistance is a three-layer laminated TPU membrane that includes a first membrane layer 10, a second membrane layer 20, and a third membrane layer 30. Each membrane layer includes a plurality of layers of TPU polymer chains 40 (represented by the solid line segments) and a plurality of modifying molecule chains 50 (represented by the dashed line segments). The modifying molecule chains 50 are grafted to the TPU polymer chains 40. The TPU polymer chains 40 in each of the first membrane layer 10, the second membrane layer 20, and the third membrane layer 30 include a plurality of hard segments and a plurality of soft segments. The modifying molecule chains 50 are grafted to the hard segments respectively or are grafted between the hard segments and the soft segments respectively, thereby enabling the TPU membrane to cover the fibers to which the TPU membrane is attached in their entirety.

More specifically, when the elastomer membrane with high water pressure resistance is adhesively attached to a textile, the modifying molecule chains 50 provide strong adhesion between the TPU membrane and the textile as well as enhanced elasticity so that the TPU membrane will hold fast to, and will not easily detach from, the textile. The addition of the modifying molecule chains 50 also provides basic waterproofness to the first membrane layer 10 and the third membrane layer 30. As can be clearly seen in the schematic drawing of FIG. 1, the first membrane layer 10 and the third membrane layer 30 have generally the same TPU polymer chain 40 density, whereas the TPU polymer chain 40 density in the second membrane layer 20 is significantly higher than those in the first and the third membrane layers 10 and 30. The high density of the second membrane layer 20 prevents high-pressure water from penetrating the second membrane layer 20. Hence, in addition to being highly adhesive, highly elastic, and waterproof as stated above, the second membrane layer 20 is resistant to high water pressure. It is worth mentioning that the first membrane layer 10, the second membrane layer 20, and the third membrane layer 30 will have generally the same density and therefore be equally resistant to high water pressure if all of them use TPU powder/particles whose weight-average molecular weights are close to or equal to 30000.

Embodiment 1

The dry material was prepared by subjecting the first TPU powder/particles to a drying treatment at 85° C., wherein the first TPU powder/particles had a weight-average molecular weight of 30000, a Shore hardness of 75 A, and a melting point of 110° C. The modifier was prepared by mixing DETA, DEAP, and DAPM together in a weight ratio of 40%:40%:20%. The dry material and the modifier were thoroughly mixed in a weight ratio of 75%:25% to produce the first mixture. The initiator and the first mixture were thoroughly mixed in a weight ratio of 0.5:100 to produce the second mixture. The second mixture was passed through a mixing device and a lamination device to form the first membrane layer. Then, the foregoing steps were repeated with the second TPU powder/particles (whose weight-average molecular weight was 100000) to form the second membrane layer on the first membrane layer. Lastly, the third membrane layer was prepared from the third TPU powder/particles (whose weight-average molecular weight was 30000) and formed on the second membrane layer to complete an elastomer membrane with high water pressure resistance.

Figure 2A:
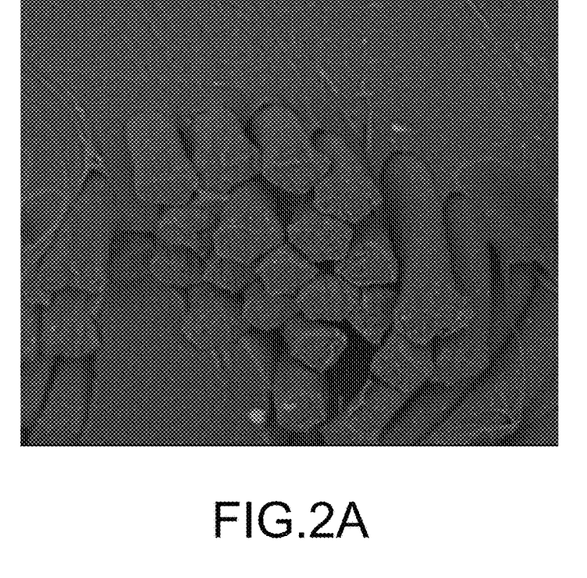
FIG. 2A is a scanning electron microscope image showing the structure of an elastomer membrane with high water pressure resistance according to the invention.
Figure 2B:
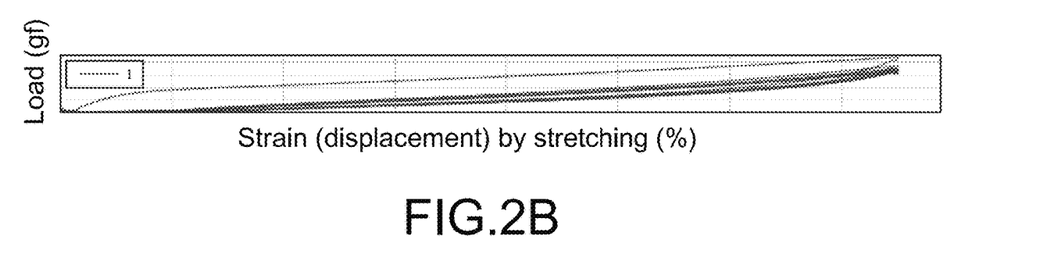
FIG. 2B is a graph showing the elastic recovery test result of an elastomer membrane with high water pressure resistance according to the invention.
Figure 2C:
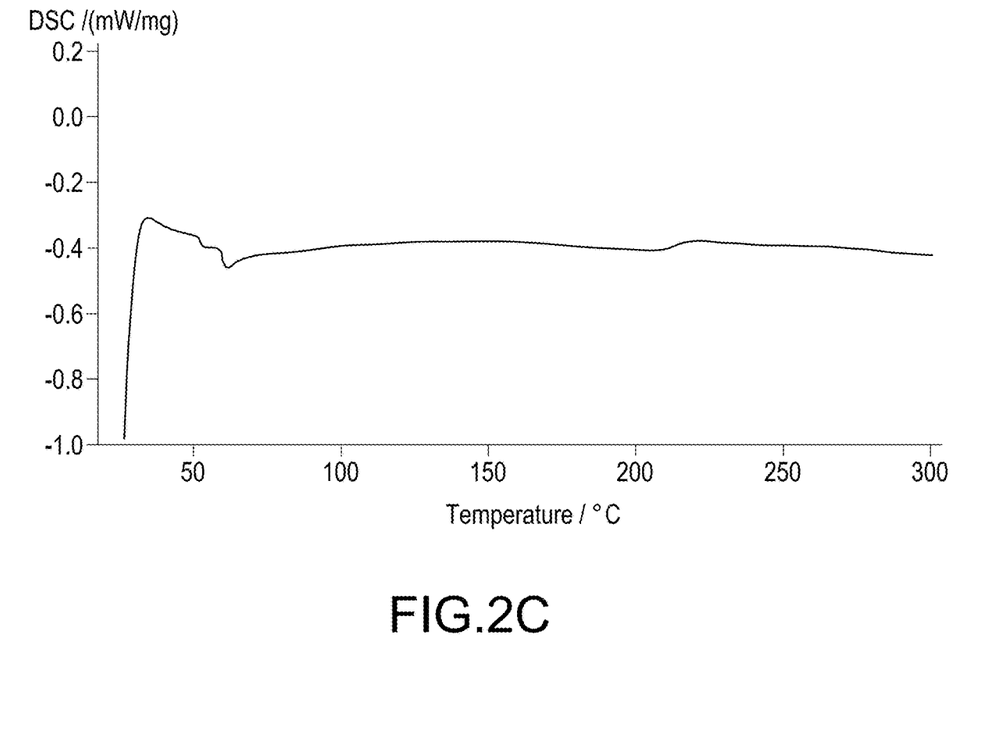
FIG. 2C is a graph showing the differential scanning calorimetry analysis result of an elastomer membrane with high water pressure resistance according to the invention.
Figure 2D:
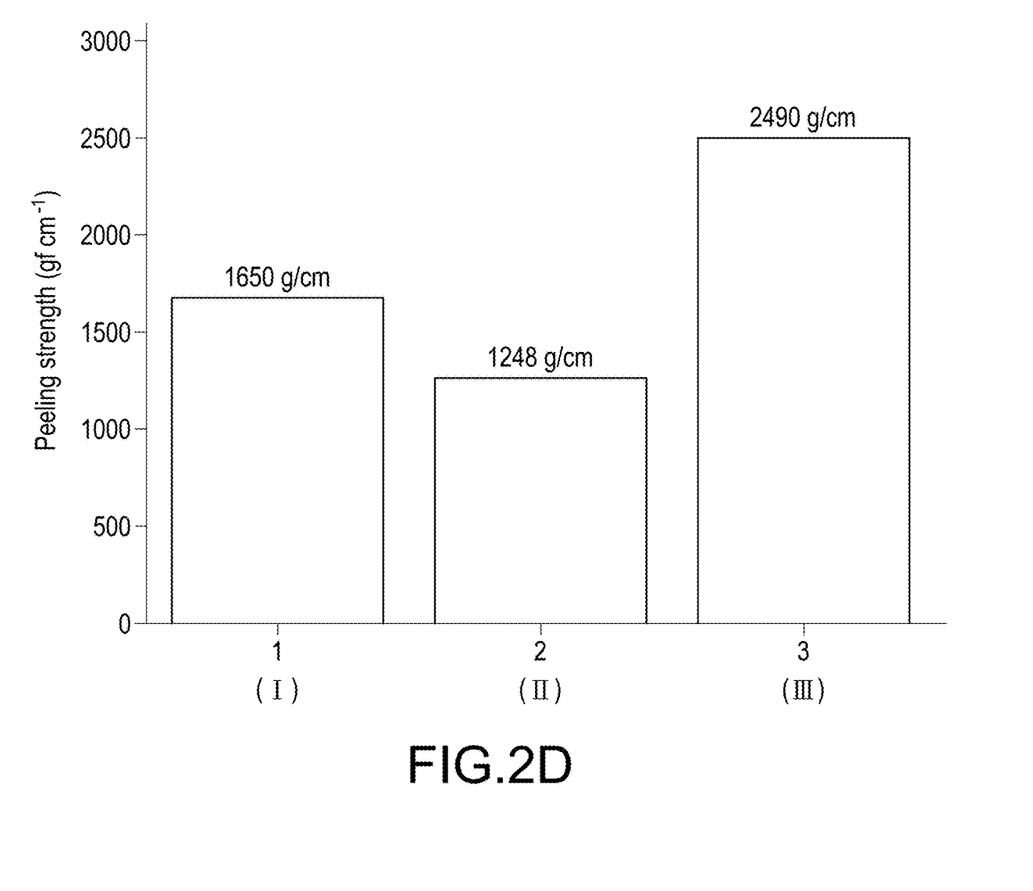
FIG. 2D is a graph showing the peeling strength test result of an elastomer membrane with high water pressure resistance according to the invention.
Figure 2E:
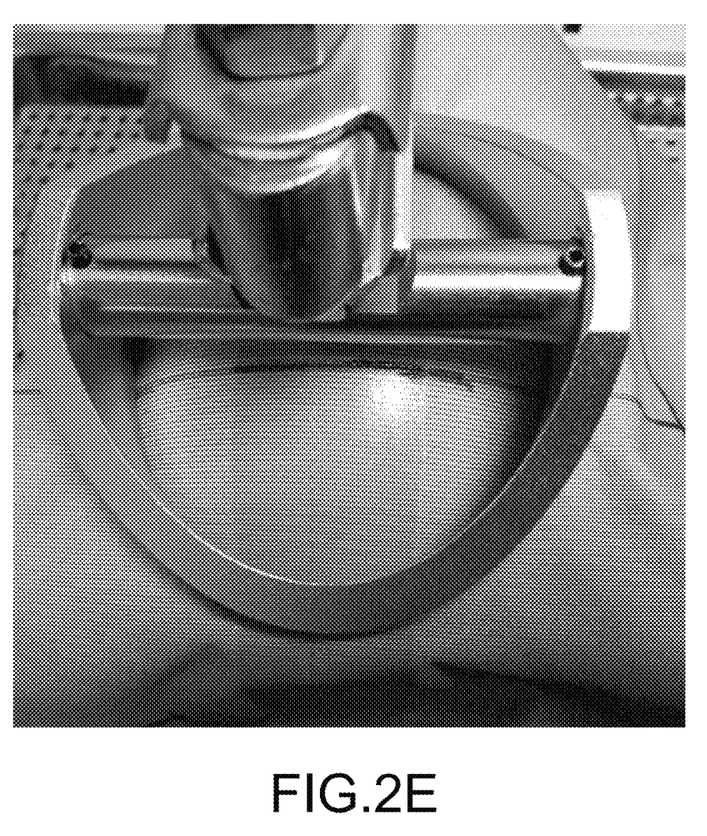
FIG. 2E is a picture showing the water pressure resistance test result of an elastomer membrane with high water pressure resistance according to the invention.

FIG. 2A provides an SEM image showing the structure of the end product. The structural integrity and uniform thickness of the end product can be seen in FIG. 2A, with the second membrane layer providing a distinct separation between the first and the third membrane layers. An elastic recovery test was performed on the end product according to British Standard EN 14704-1, and the test result (see FIG. 2B) shows 100% elastic recovery. Referring to FIG. 2C for the differential scanning calorimetry (DSC) analysis result of the end product, both the low melting temperature peak and the high melting temperature peak have a small area, and the chance of phase separation between the three layers of material is low and approaches the average value. The peeling strength of the end product was tested by the method specified in ISO 2411, and according to the test result shown in FIG. 2D, which compares the end product (III) with a conventional TPU membrane (I) and a conventional three-layer laminated TPU membrane (II), the peeling strength of the end product (III) was higher than those of the conventional ones by at least about ½. Last but not least, a water pressure resistance test was conducted on the end product using the method specified in ISO 811, and the test result (see FIG. 2E) shows that the three-layer laminated TPU membrane was impermeable to water even when the water pressure reached 10000 mmH$_2$O.

Embodiment 2

The dry material was prepared by subjecting the first TPU powder/particles to a drying treatment at 70° C., wherein the first TPU powder/particles had a weight-average molecular weight of 10000, a Shore hardness of 50 A, and a melting point of 40° C. The modifier was prepared by mixing DETA, DEAP, and DAPM together in a weight ratio of 30%:50%:20%. The dry material and the modifier were thoroughly mixed in a weight ratio of 75%:25% to produce the first mixture. The initiator and the first mixture were thoroughly mixed in a weight ratio of 0.5:100 to produce the second mixture. The second mixture was passed through the mixing device and the lamination device to form the first membrane layer. Then, the foregoing steps were repeated with the second TPU powder/particles (whose weight-average molecular weight was 30000) to form the second membrane layer on the first membrane layer. Lastly, the third membrane layer was prepared from the third TPU powder/particles (whose weight-average molecular weight was 10000) and formed on the second membrane layer.

Embodiment 3

The dry material was prepared by subjecting the first TPU powder/particles to a drying treatment at 80° C., wherein the first TPU powder/particles had a weight-average molecular weight of 15000, a Shore hardness of 100 A, and a melting point of 180° C. The modifier was prepared by mixing DETA, DEAP, and DAPM together in a weight ratio of 50%:40%:10%. The dry material and the modifier were thoroughly mixed in a weight ratio of 50%:50% to produce the first mixture. The initiator and the first mixture were thoroughly mixed in a weight ratio of 0.01:100 to produce the second mixture. The second mixture was passed through the mixing device and the lamination device to form the first membrane layer. Then, the foregoing steps were repeated with the second TPU powder/particles (whose weight-average molecular weight was 60000) to form the second membrane layer on the first membrane layer. Lastly, the third membrane layer was prepared from the third TPU powder/particles (whose weight-average molecular weight was 15000) and formed on the second membrane layer.

Embodiment 4

The dry material was prepared by subjecting the first TPU powder/particles to a drying treatment at 80° C., wherein the first TPU powder/particles had a weight-average molecular weight of 20000, a Shore hardness of 75 A, and a melting point of 110° C. The modifier was prepared by mixing DETA, DEAP, and DAPM together in a weight ratio of 40%:30%:30%. The dry material and the modifier were thoroughly mixed in a weight ratio of 95%:5% to produce the first mixture. The initiator and the first mixture were thoroughly mixed in a weight ratio of 0.5:100 to produce the second mixture. The second mixture was passed through the mixing device and the lamination device to form the first membrane layer. Then, the foregoing steps were repeated with the second TPU powder/particles (whose weight-average molecular weight was 60000) to form the second membrane layer on the first membrane layer. Lastly, the third membrane layer was prepared from the third TPU powder/particles (whose weight-average molecular weight was 20000) and formed on the second membrane layer.

Embodiment 5

A modifying solution (i.e., the modifier) was prepared from DETA, DEAP, and DAPM in a weight ratio of 100%:0%:0%, and the remaining steps were the same as in embodiment 1.

Embodiment 6

A modifying solution (i.e., the modifier) was prepared from DETA, DEAP, and DAPM in a weight ratio of 0%:100%:0%, and the remaining steps were the same as in embodiment 2.

Embodiment 7

A modifying solution (i.e., the modifier) was prepared from DETA, DEAP, and DAPM in a weight ratio of 0%:0%:100%, and the remaining steps were the same as in embodiment 3.

The elastic recovery test results, peeling strength test results, and water pressure resistance test results of the end products of embodiments 2~7 and of a conventional laminated elastomer membrane are tabulated as follows:

| | Elastic recovery (%) | Peeling strength (g/cm) | Water pressure resistance (mmH$_2$O) |
|---|---|---|---|
| Embodiment 2 | 99 | 2490 | 10000 |
| Embodiment 3 | 99 | 2560 | 10000 |
| Embodiment 4 | 99 | 2250 | 10000 |
| Embodiment 5 | 100 | 2670 | 10000 |

-continued

| | Elastic recovery (%) | Peeling strength (g/cm) | Water pressure resistance (mmH$_2$O) |
|---|---|---|---|
| Embodiment 6 | 100 | 2310 | 10000 |
| Embodiment 7 | 100 | 2450 | 10000 |
| Conventional laminated elastomer membrane | 98 | 1248 | 2000 |

To sum up, the embodiments of the present invention have the following advantages and effects:

1. The major effect of the present invention is an increase in the water pressure resistance of an elastomer membrane and is achieved by preparing an intermediate layer of the elastomer membrane from TPU powder/particles having a high weight-average molecular weight;

2. A modifier is used to modify a TPU membrane and thereby increase the waterproofness, adhesion, and elasticity of the membrane significantly; and 3. As the modifying molecule chains in the invention are grafted respectively to the hard segments of the TPU polymer chains or to the junctions between the hard segments and soft segments of the TPU polymer chains, the resulting TPU membrane features structural integrity and uniformity in thickness.

It should be understood that the embodiments described above and shown in the accompanying drawings are only some preferred ones of the present invention and are not intended to be restrictive of the features or scope of the invention. The scope of the invention is defined by the appended claims and encompasses all the embodiments based on the spirit of the claims (or on similar variations thereof) and any change or modification that is easily conceivable by a person skilled in the art.

What is claimed is:

1. A method of preparing an elastomer membrane with high water pressure resistance, the method comprising the steps of:
   (a) preparing a dry material by subjecting first thermoplastic polyurethane (TPU) powder/particles to a drying treatment at 70° C.~85° C.;
   (b) preparing a modifier, wherein the modifier is one or a mixture of at least two of diethylenetriamine, diethylaminopropylamine, and diaminodiphenylmethane;
   (c) preparing a first mixture by mixing the dry material thoroughly with the modifier in a weight ratio of 50%~95%:5%~50%;
   (d) preparing a second mixture by mixing an initiator thoroughly with the first mixture in a weight ratio of 0.01~5:100;
   (e) preparing a first membrane layer by passing the second mixture through a mixing device and a lamination device;
   (f) preparing a second membrane layer by repeating the steps (a) to (e) with second TPU powder/particles, wherein the second TPU powder/particles have a weight-average molecular weight higher than or equal to a weight-average molecular weight of the first TPU powder/particles, and the second membrane layer is formed on the first membrane layer; and
   (g) preparing a third membrane layer by repeating the steps (a) to (e) with third TPU powder/particles, wherein the third TPU powder/particles have a weight-average molecular weight equal to the weight-average molecular weight of the first TPU powder/particles, and the third membrane layer is formed on the second membrane layer.

2. The method of preparing the elastomer membrane with high water pressure resistance as claimed in claim 1, wherein the modifier is a mixture of diethylenetriamine, diethylaminopropylamine, and diaminodiphenylmethane in a weight ratio of 30%~50%:30%~50%:10%~30%.

3. The method of preparing the elastomer membrane with high water pressure resistance as claimed in claim 1, wherein the modifier is a mixture of diethylenetriamine, diethylaminopropylamine, and diaminodiphenylmethane in a weight ratio of 40%:40%:20%.

4. The method of preparing the elastomer membrane with high water pressure resistance as claimed in claim 1, wherein the weight-average molecular weight of the first TPU powder/particles and the weight-average molecular weight of the third TPU powder/particles are between 10000 and 30000 inclusive, the first TPU powder/particles and the third TPU powder/particles have Shore hardnesses between 50 A and 100 A inclusive and melting points between 40° C. and 180° C. inclusive, the weight-average molecular weight of the second TPU powder/particles is between 30000 and 100000 inclusive, and the second TPU powder/particles have a Shore hardness between 50 A and 100 A inclusive and a melting point between 40° C. and 180° C. inclusive.

5. The method of preparing the elastomer membrane with high water pressure resistance as claimed in claim 1, wherein the initiator is one of a photoinitiator and a thermal initiator.

6. The method of preparing the elastomer membrane with high water pressure resistance as claimed in claim 1, wherein the initiator is thoroughly mixed with the first mixture in a weight ratio of 0.5:100.

7. The method of preparing the elastomer membrane with high water pressure resistance as claimed in claim 1, wherein the initiator is one of potassium persulfate, azobisisobutyronitrile, and benzildimethyl ketal.

8. The method of preparing the elastomer membrane with high water pressure resistance as claimed in claim 1, wherein each of the first TPU powder/particles, the second TPU powder/particles, and the third TPU powder/particles is subjected to the drying treatment at 85° C.

9. The method of preparing the elastomer membrane with high water pressure resistance as claimed in claim 1, wherein each of the first membrane layer, the second membrane layer, and the third membrane layer comprises a plurality of layers of thermoplastic polyurethane (TPU) polymer chains and a plurality of modifying molecule chains, the modifying molecule chains are grafted to the TPU polymer chains, and the second membrane layer has a higher TPU polymer chain density than the first membrane layer and the third membrane layer.

10. The method of preparing the elastomer membrane with high water pressure resistance as claimed in claim 9, wherein each said layer of TPU polymer chains comprises a plurality of hard segments and a plurality of soft segments, and the modifying molecule chains are grafted to the hard segments respectively or are grafted between the hard segments and the soft segments respectively.

* * * * *